Sept. 25, 1934.    K. GOES ET AL    1,974,712
SUBMARINE CABLE FOR COMMUNICATION PURPOSES
Filed Sept. 6, 1930
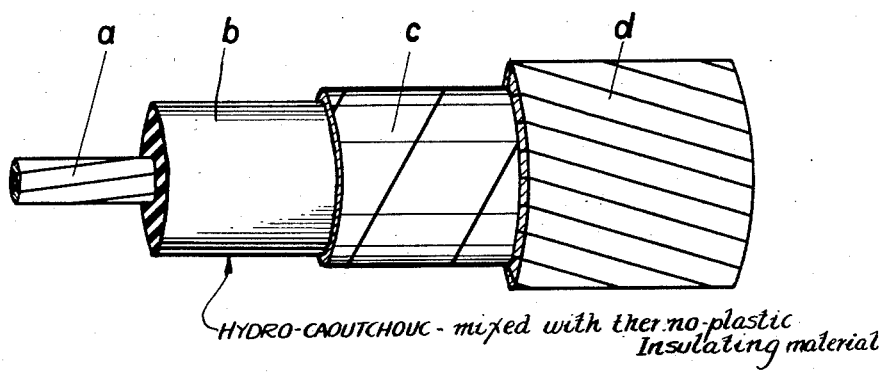
Inventor
K Goes
E Badum
By Marks Clark
Attys.

Patented Sept. 25, 1934

1,974,712

UNITED STATES PATENT OFFICE 1,974,712

SUBMARINE CABLE FOR COMMUNICATION PURPOSES

Konrad Goes, Rosrath, near Cologne, and Ernst Badum, Cologne-Mulheim, Germany, assignors to Felten & Guilleaume Carlswerk, Actien-Gesellschaft, Cologne-Mulheim, Germany Application September 6, 1930, Serial No. 480,232
In Germany September 23, 1929

6 Claims. (Cl. 173—264)

In the manufacture of submarine cables for communication purposes attempts have long been made to replace the expensive gutta-percha by a cheaper insulating material which is its equivalent as regards its mechanical and electrical properties or is even superior to it as regards the angle of loss. The substitutes hitherto suggested do not, however, satisfy the requirements as regards the di-electric constant, the insulating value, the angle of loss or finally as regards the requisite durability.

According to the present invention it is proposed to use as a substitute for the gutta-percha insulation usually employed with submarine cables for communication purposes a cheaper insulating material which has very favourable electrical and mechanical properties. For this purpose the employment of hydrogenated caoutchouc is proposed as insulation for submarine cables. Hydro-caoutchouc is not attacked even by the strongest chemical reagents and is extremely stable to sea-water. A test of the properties of this insulating material has shown that hydrocaoutchouc is a particularly suitable substitute for the gutta-percha insulation of submarine cables which, as regards its electrical properties is not only equal to gutta-percha but is even superior to it. The di-electric constant of hydrocaoutchouc at a cyclic frequency of $\omega=5,000$ amounts independently of the temperature to 2.54 and the specific resistance is greater than $6.5\times10^{13}$ ohms per c. c. Besides these extremely favourable values, hydro-caoutchouc when used as an insulating material for submarine cables for communication purposes shows very small values for the angle of loss as compared with other known substitute materials. At $\omega=5,000$ the tangent of the angle of loss (tan $\delta$) is approximately equal to $0.7\times10^{-3}$. As a comparative value may, for instance, be given the value of the angle of loss of gutta-percha mixture as used for submarine cables, this angle of loss being tan $\delta=17.8\times10^{-3}$ and that of another known gutta-percha substitute consisting of a mixture of partially deresined balata and nitrogen-free caoutchouc, with a value of tan $\delta=9.25\times10^{-3}$. In order to improve the mechanical properties of the hydrocaoutchouc here proposed as the insulation for submarine cables, it can be mixed with guttapercha, deresined or underesined balata with nitrogen-free rubber and also with Montan wax i. e. the wax obtained by extracting brown coal with solvents (either with one or with several or with all the constituents simultaneously), without the electrical properties being appreciably changed.

A submarine cable made in accordance with the invention is shown in the accompanying drawing, in which $a$ is the copper core of the cable and $b$ the insulation made of the substances referred to above, $c$ a layer of jute and $d$ the usual armouring of the cable consisting of iron wires.

Hydro-caoutchouc (hydrogenated caoutchouc) hereinbefore referred to is formed by treatment of ordinary caoutchouc with hydrogen at raised temperature and raised pressure. A process for making hydro-caoutchouc is, for example, described in German specification No. 415,871 (Staudinger). By treatment with hydrogen the caoutchouc partly loses its elastic properties and is converted into a tough product which, as researches carried out by the applicants have shown, possesses outstanding electrical properties and therefore is particularly suited as insulating material for submarine cables.

What we claim is:—

1. Submarine cable for communication purposes having an insulation of hydro-caoutchouc mixed with other thermo-plastic insulating material.

2. A submarine cable for communication purposes having an insulation of hydro-caoutchouc mixed with gutta-percha.

3. A submarine cable for communication purposes having an insulation of hydro-caoutchouc and balata.

4. A submarine cable for communication purposes having an insulation of hydro-caoutchouc mixed with nitrogen-free rubber.

5. A submarine cable for communication purposes having an insulation of hydro-caoutchouc mixed with Montan wax.

6. A submarine cable for communication purposes having an insulation of hydro-caoutchouc mixed with one or more of the following substances:—gutta-percha, balata, rubber and Montan wax.

KONRAD GOES.
ERNST BADUM.